June 23, 1970     R. V. WOOD     3,516,730

SELF-ADHESIVE DIFFRACTION GRATINGS

Filed Feb. 13, 1967

*Remsen V. Wood*

INVENTOR.

BY *John F. McClellan*

AGENT

United States Patent Office 3,516,730
Patented June 23, 1970

3,516,730
SELF-ADHESIVE DIFFRACTION GRATINGS
Remsen V. Wood, Riderwood, Md. 21139
Continuation-in-part of application Ser. No. 467,312,
May 28, 1965, and Ser. No. 606,988, Jan. 3, 1967. This
application Feb. 13, 1967, Ser. No. 615,421
Int. Cl. G02b 5/18
U.S. Cl. 350—162                                                  1 Claim

ABSTRACT OF THE DISCLOSURE

Ornamental diffraction gratings impressed in reflectively coated transparent plastic sheet, with self-adhesive material on the gratings to provide for ready attachment to chosen surfaces; optically transparent self-adhesive material in one embodiment allows use of both faces of the grating.

---

This application is a continuation-in-part of my co-pending applications for U.S. patent as follows: Ser. No. 467,312 filed June 28, 1965, entitled Diffraction Type Mosaic System, now abandoned but continued-in-part as Ser. No. 797,324, filed Jan. 9, 1969, for Diffraction Type Mosaic System; and Ser. No. 606,988, filed Jan. 3, 1967 entitled Inlay Diffraction Gratings.

This invention relates to optical diffraction gratings and particularly to ornamental optical diffraction gratings.

Essence of the invention lies in the provision of self-adhesive optical diffraction gratings, making possible significant advances over the art to date, as revealed by objects of this invention, which are:

To provide, as a new article of commerce, spirally ruled self-adhesive optical diffraction gratings;

To improve the optical efficiency of spiral diffraction grating jewelry by making economically feasible the use of flat gratings with jewelry findings;

To protect rulings of the gratings from damage between the time of manufacture and installation, and to prevent damage on installation;

To permit the use in ornamental gratings of otherwise easily corroded reflective coatings such as those of silver, brass, and copper, by protectively covering the films while fresh with self-adhesive substance;

To identify the ruled grating-face to insure that the rulings are not, as installed, exposed to wear;

And to provide for factory affixation of optical grade adhesive to produce self-adhesive gratings with two usable faces.

These and other objects and advantages of the invention will become apparent from the following description and drawings in which.

Spiral diffraction gratings are best suited for ornamental use when the rulings are in-plane. Surface curvature results either in reduction of area effective to diffract light from source to observer, or in mixing of spectra. Both effects detract from the ornamental appearance of gratings.

Despite the known disadvantages of non-plane gratings, prior to this invention it was necessary in the manufacture of spiral grating earrings, brooches and similar jewelry to draw the gratings into cup shape to contain the cement required for attachment to the findings. Efforts to constrain the center of the grating area so that it would remain flat were not completely successful, and some convexity or concavity resulted.

Such distortion of the grating surface is entirely avoided by the present invention, which does away with the need for cupping, by substituting a semi-solid contact cement, termed self-adhesive, for the time-setting liquid cement previously used.

Figure 1:
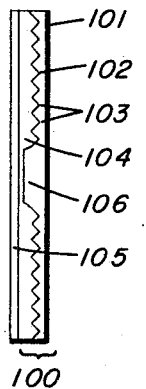
FIG. 1 is an edge view of an ornamental diffraction grating assembly having an inlay.
Figure 2:
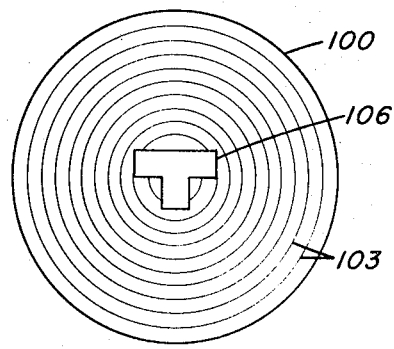
FIG. 2 is a face view of the FIG. 1 embodiment of the invention.

FIGS. 1 and 2 show in edge- and face-view respectively an embodiment of this invention comprising grating assembly 100, made preferably of transparent plastic film 101, such as cellulose acetate, coated with a reflective film 102, such as vacuum deposited aluminum, and impressed with rulings 103, preferably spiral and of about 15,000 lines per inch spacing.

A layer 104 of self-adhesive substance such as a rubber base contact cement selected from the many commercial products available for the purpose, is affixed to the ruling surface, and is guarded by waxed paper 105, which is readily removable to permit the grating to be affixed to a chosen surface. The adhesive selected may be of optical grade with consequent advantages related below in connection with FIG. 3.

Apparent in FIGS. 1 and 2 are other advantages of incorporating self-adhesive in the grating assembly. 106 is an inlay in the grating. Such inlays can be unruled or ruled, in various combinations with the rest of the assembly, as disclosed in my applications which are copending with this application, as set forth immediately following the Abstract of the Disclosure, above. In a prefered embodiment of the inlay invention, the inlay protrudes considerably beyond the average plane of the grating, as in FIG. 1, and is vulnerable to damage before and on installation. The possibility of damage is reduced by the relatively thick layer of factory applied adhesive. The adhesive serves as an abrasion-resistant covering, and as a cushion to prevent crushing of the grating rulings and inlay on installation.

A further advantage of this structure is that small iregularities of the intended mounting surface are accommodated in the thickness of the adhesive.

Figure 3:
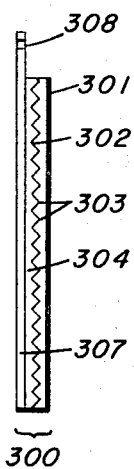
FIG. 3 is an edge view of another embodiment of the invention.

FIG. 3 shows an embodiment of the invention employing a single grating which provides for diffraction from both faces of the grating.

The grating assembly 300, comprising transparent plastic 301, reflective film 302, impressed rulings 303, and adhesive 304, is secured by self-adhesion to transparent plastic pendant finding 307 having a hole 308 for the pendant suspension (not shown).

Figure 4:
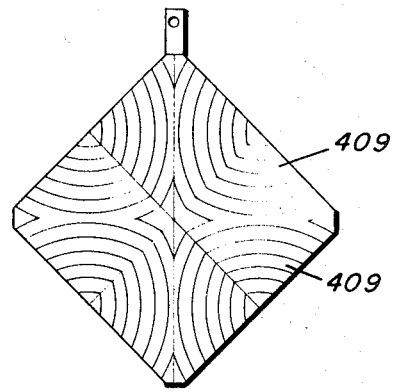
FIG. 4 is a face view of a mosaic grating variation of the FIG. 3 embodiment.

FIG. 4 is a face view of this embodiment which, for purposes of illustration, is shown as a mosaic of several gratings 409, but which is otherwise identical to the FIG. 3 version.

The adhesive used in these embodiments is of optical grade, that is, of clear homogeneous transparency, and is pressed between the surfaces to achieve optical contact with the rulings 303 and the finding 307, FIG. 3.

Adhesives suitable for the purpose are well known in the art, as for example, the "disappearing" adhesives used in the assembly of transparent plastic parts.

The construction described permits efficient diffraction of light from both faces of the rulings, and results in a grating article of enhanced beauty and utility at reasonable cost. The wearer need not be concerned with which face of the pendant is toward the observer, since the faces are equally attractive in appearance.

A similar use of both faces of the grating is in window displays, where gratings are affixed directly to the window by the self-adhesive. Entrapment of air and other foreign material against the rulings, which might occur in on-the-job application of cement, is avoided by the construction described.

When gratings like these described are made without factory applied self-adhesive, it is difficult under many lighting conditions to determine which face of the grating is plastic covered.

This leads to wrong-side-out installation, exposing the rulings and the reflective film to abrasion and corrosion. Abrasion of the rulings and corrosion of the film are prevented by factory application of appropriate adhesive to the gratings as they are made. On manufacture, the gratings are impressed in a reflective face of a strip of plastic material which is immediately thereafter, and before the gratings are cut out, mated by machine with an equivalent strip of self-adhesive material, which serves to identify and protect the faces of the grating.

It is obvious that many other versions of this invention may be practiced within the teachings of this disclosure.

For example, although pressure sensitive adhesive is described, the self-adhesive material may be of the heat sensitive, the pressure setting, or other common type, and may or may not require the guard paper shown. The plastic material described may be other than that commonly termed plastic and yet be suitable for the purpose. The rulings may be circular or spiral and may comprise a single grating or a mosaic of gratings as shown above and as described in said co-pending applications.

In summary, the enhancive, self-protective, and convenience features of this invention open new range of applications for ornamental diffraction gratings, and no restriction to the exact examples given is intended.

I claim:
1. A self-adhesive inlay diffraction grating comprising a single piece of transparent sheet material having a plane surface, a reflective coating on the surface, a spiral ruling impressed in the coated surface; an inlay comprising an unruled area of said material protrusive from said sheet parallel to said surface having the ruling and contiguously connected therewith, said inlay and contiguous connection being reflectively coated, and contact self-adhesive transparent substance affixed to all said ruling, contiguous connection and inlay.

References Cited
UNITED STATES PATENTS

| | | | |
|---|---|---|---|
| 818,966 | 4/1906 | Ives | 350—162 |
| 1,354,471 | 10/1920 | Doner | 350—162 X |
| 2,313,489 | 3/1943 | Latrobe. | |
| 2,463,280 | 3/1949 | Kaehni et al. | 350—162 |
| 2,464,738 | 3/1949 | White et al. | 350—162 X |
| 3,413,750 | 12/1968 | Henry. | |

JOHN K. CORBIN, Primary Examiner